Nov. 8, 1927.
J. T. CORDREY
1,648,112
APPARATUS FOR RECLAIMING AND SHARPENING FILES
Filed April 10, 1926 2 Sheets-Sheet 1
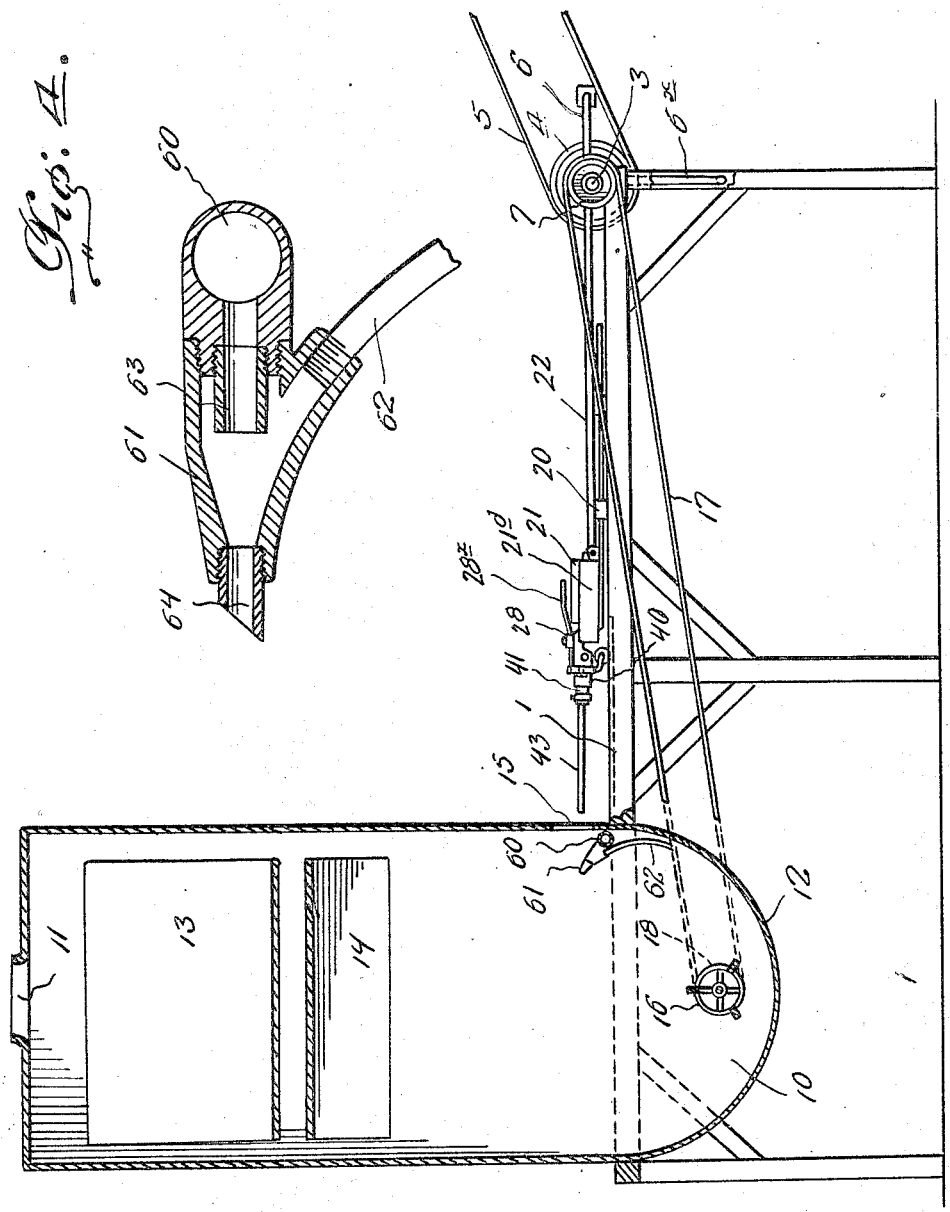
Inventor
J. T. Cordrey,
By Clarence A O'Brien
Attorney Nov. 8, 1927. 1,648,112
J. T. CORDREY
APPARATUS FOR RECLAIMING AND SHARPENING FILES
Filed April 10, 1926 2 Sheets-Sheet 2
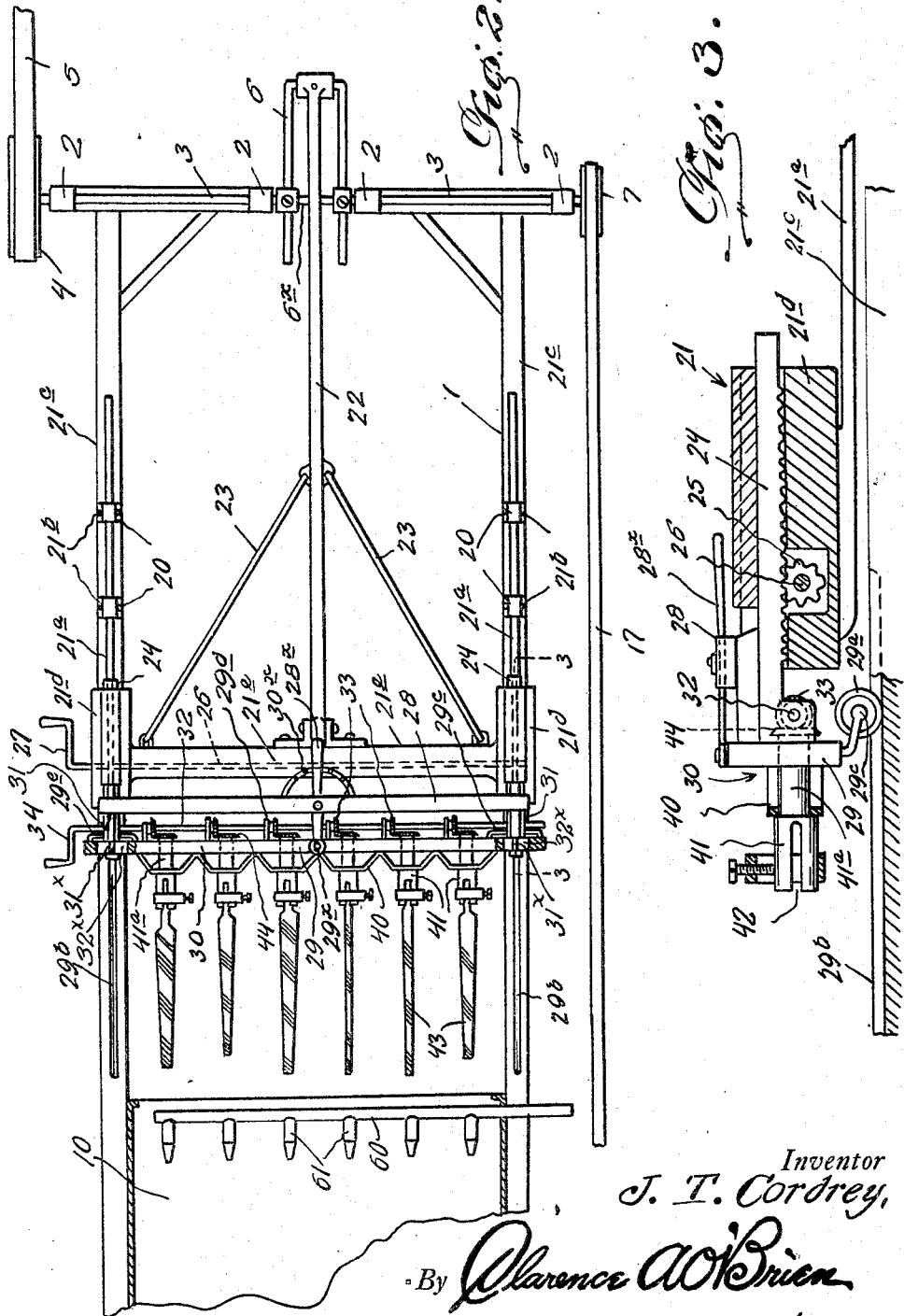
Inventor
J. T. Cordrey,
By Clarence A. O'Brien
Attorney Patented Nov. 8, 1927.

1,648,112

UNITED STATES PATENT OFFICE.

JOSEPH T. CORDREY, OF AUBURN, WASHINGTON.

APPARATUS FOR RECLAIMING AND SHARPENING FILES.

Application filed April 10, 1926. Serial No. 101,133.

My present invention has to do with the reclaiming and sharpening of files; and it contemplates the provision of an apparatus for the purpose indicated that is highly efficient and expeditious in producing the results desired on files subjected to its action.

Other objects and practical advantages of the invention will be fully understood from the following description and claims when the same are read in connection with the drawings, accompanying and forming part of this specification, in which:—

Figure 1 is a view, partly in side elevation and partly in longitudinal vertical section, showing the preferred embodiment of my invention which has been reduced to actual practice and successfully operated.

Figure 2 is a partial plan and horizontal section of the apparatus.

Figure 3 is a fragmentary view, on an enlarged scale, taken at right angles to Figure 2 and showing a portion of the mechanism, hereinafter explicitly referred to.

Figure 4 is an enlarged longitudinal section illustrative of one of the peculiar and advantageous nozzles embraced in my improvement.

Similar numerals of reference designate corresponding parts in all of the views of the drawings.

The main frame 1 of the apparatus may be of the construction illustrated or of any other construction compatible with the purpose of the apparatus, and it is provided at 2 with bearings for a crank shaft 3, the said shaft 3 being provided with a pulley 4 or other appropriate means for cooperation with a driving connection 5 designed to connect the shaft 3 with an appropriate motor. The crank of the shaft 3 is designated by 6 and at its end remote from the pulley 4, the shaft 3 is provided with another pulley 7 for a purpose hereinafter set forth. Said crank 6 is movable in a pendant fixed guard 6ˣ on the main frame 1.

Carried by and appropriately connected with the frame 1 is a container 10 for grained carborundum, the said container 10 being provided at its upper end with an eduction orifice 11 for air under pressure, steam, or any other fluid under pressure that it is desired to use in the operation of my novel apparatus. The bottom of the container 10 is preferably shaped as designated by 12, and in the container 10 and arranged adjacent to the eduction orifice 11 are baffles 13 and 14, preferably connected alternately to opposite side walls of the container and arranged and constructed as shown in Figure 1. The inner transverse upright wall of the container 10 is provided with a large opening as designated by 15, and in the lower portion of the container 10 is disposed a rotary agitator or stirrer 16, which extends substantially throughout the width of the container and has for its function to maintain the carborundum in an agitated state, and to contribute toward the dissemination of the carborundum within the container. The said stirrer 16 is designed to be driven from the crank shaft 3 through the medium of a belt 17, and a pulley 18 on one end of the shaft of the stirrer 16.

Appropriately guided at 20 on the frame 1 and adapted to be translated longitudinally on the said frame 1 is a transverse carriage 21 between which and the crank 6 is interposed and connected a pitman 22, the said pitman being preferably braced by links 23, interposed between and pivotally connected to the carriage 21 and the pitman 22 at an intermediate point in the length of the latter. As illustrated, the said carriage 21 is made up of longitudinal rods 21ᵃ movable rectilinearly in guides 21ᵇ on the frame bars 21ᶜ, longitudinally-disposed blocks 21ᵈ fixed to said rods 21ᵃ, Figure 3, and arranged and movable above said frame bars 21ᶜ and a cross bar 21ᵉ interposed between and fixed to the said blocks 21ᵈ. Guided and housed in the said blocks 21ᵈ of frame 21 are longitudinal racks 24, and meshed with said racks 24 are pinions 25 on a transverse shaft 26, journaled in appropriate bearings in the blocks 21ᵈ of the carriage 21, and equipped at one end with a crank 27. The racks 24 are formed integral with or are fixedly connected to a transverse bar 28 and form therewith a sub-carriage, and journaled and movable endwise in appropriate bearings 31 in said sub-carriage generally designated by 30 is a transverse shaft 32 equipped with miter gears 33 and provided at one of its ends with a crank 34. Movable transversely of the apparatus on the forward ends 31ˣ of the bars carrying the rack 24 is a bar 29, said bar having slots 32ˣ receiving said bar ends 31ˣ, Figure 2. Wheels 29ᵃ are arranged and guided in channels 29ᵇ in the longitudinal bars of the frame 1, and transverse rods 29ᶜ carried by the bar 29 form the axles of and are movable through said wheels 29ª. It will also be understood that the bar 29 has arms 29ᵈ in which the shaft 32 is journaled and that the bar 29 and the shaft 32 are movable together transversely of the apparatus. The bar 29 is equipped with bracket means 40, and journaled in the said bar 29 and bracket means 40 are longitudinally disposed rotary holders 41, appropriately adapted at 42 for the detachable connection of files, designated by 43. The shaft portions 41ª of the holders 41 are provided at their rear ends with miter gears 44, meshed with the miter gears 33 on the shaft 32, and consequently it will be understood that turning of the crank 34 which is located at one side of the apparatus will be attended by turning of the files 43 about their axes so as to present the said files to the best advantage to the reclaiming and sharpening action of the carborundum in the container 10.

Fulcrumed at an intermediate point of its length to the bar 28 of the sub-carriage 30 is a horizontally-swingable lever 28ˣ connected at 29ˣ to the bar 29; and on the bar 28 is an arcuate rack 30ˣ for adjustably fixing the lever 28ˣ. Manifestly when lever 28ˣ is sprung out of engagement with said rack, the lever 28ˣ may be swung to move the bar 29 and its appurtenances transversely of the apparatus.

Located in the container 10 below the opening in the front wall thereof is a conduit 60 extending transversely of my novel apparatus and adapted to be connected with a source of fluid pressure supply either air or steam. Communicating with the said conduit 60 at intervals in the length thereof and at intervals in the width of the container are nozzles 61, having siphon portions 62 for the suction of carborundum and for the entraining of the carborundum with the air or steam, as the case may be, jetted at 63 in the nozzles and in alinement with the eduction orifices 64 thereof.

In the practical operation of my novel apparatus, it will be noted from the foregoing that when the shaft 3 is driven, the carriage 21 will be reciprocated on the frame 1 for the advancement of the files through the said opening 15 in the front wall of the carborundum container and for the alternate retraction of the files, and that while the files are in the carborundum container they will be subjected to the blasts of carborundum from the nozzles 61 with the result that the files will be reclaimed and adequately sharpened.

Incident to the operation the files are turned about their axes through the medium of the crank 34; and it will also be understood that the adjustment of the sub-carriage 30 on the carriage 21 permits of the files being projected into the carborundum container 10 to a greater or less extent as is deemed expedient, and that the transverse adjustment of the bar 29 and the parts carried thereby, relative to the sub-carriage 30, is also materially advantageous in the sharpening of the files, and also to take care of various length files.

It will be apparent from the foregoing that notwithstanding the capacity of function of my apparatus, the apparatus is not unduly complicated, and, as a whole, is well adapted to withstand the usage to which apparatus of corresponding character is ordinarily subjected.

I have entered into a detailed description of the construction and relative arrangement of the parts comprised in the present and preferred embodiment of my invention in order to impart a full, clear and exact understanding of the said embodiment. I do not desire, however, to be understood as confining myself to the specific construction and relative arrangement of parts as disclosed, my invention being defined by my appended claims within the scope of which changes in structure and changes in arrangement may be made without departure from my invention.

Having described my invention, what I claim and desire to secure by Letters-Patent is:—

1. In apparatus for sharpening and reclaiming files, a carborundum container adapted for the entrance of files, fluid pressure nozzles disposed in said container and having siphons, reciprocatory file carrying means, and means for reciprocating said carrying means; the said file carrying means being equipped with means for carrying a plurality of files and means whereby the files may be turned about their axes in concert.

2. In apparatus for sharpening and reclaiming files, a carborundum container adapted for the entrance of files, fluid pressure nozzles disposed in said container and having pendent siphons, reciprocatory file carrying means for a plurality of files, and means for reciprocating said carrying means; the said file carrying means being equipped with means whereby the plurality of files may be turned about their axes in concert, means whereby the files may be manually shifted transversely of the apparatus in concert and may be adjustably fixed, and means whereby the plurality of files may be manually advanced or retracted longitudinally relative to the carrying means.

3. In an apparatus for sharpening and reclaiming files comprising a main frame, a crank shaft mounted on the frame, a reciprocatory carriage on the frame and connected with the crank shaft, a sub-carriage translatable longitudinally on the first-named carriage, said sub-carriage having a transversely-movable portion, manually operable means for moving the sub-carriage longitudinally on the first-named carriage, a bracket means carried by said transversely-movable portion of the sub-carriage, file holders journaled in said portion and bracket means, miter gears on said holders, a manually operable shaft carried by the sub-carriage and movable with said transversely movable portion and having miter gears meshed with those on the file holders, and means for adjusting and adjustably fixing the transversely movable portion of the sub-carriage for the positioning of files in the holders at various points.

4. An apparatus for sharpening and reclaiming files comprising a main frame, a crank shaft mounted on the frame, a reciprocatory carriage on the frame and connected with the crank shaft, a sub-carriage translatable longitudinally on the first-named carriage, said sub-carriage having a transversely-movable portion, manually operable means for moving the sub-carriage longitudinally on the first-named carriage, bracket means carried by said transversely movable portion of the sub-carriage, file holders journaled in said portion and bracket means, miter gears on said holders, a manually operable shaft carried by the sub-carriage and movable with said transversely movable portion and having miter gears meshed with those on the file holders, and means for adjusting and adjustably fixing the transversely movable portion of the sub-carriage for the positioning of files in the holders at various points; the said main frame having longitudinal channels, and the said transversely-movable portion of the sub-carriage being provided with rods extending transversely of the apparatus, and wheels disposed in said channels and turnable on said rods and said rods movable endwise through the wheels.

In testimony whereof I affix my signature.

JOSEPH T. CORDREY.